United States Patent
Chyou et al.

(10) Patent No.: US 9,890,949 B2
(45) Date of Patent: Feb. 13, 2018

(54) HYDROCARBON FUEL REACTOR FOR SEPARATING AND PURIFYING CARBON DIOXIDE

(71) Applicant: Institute of Nuclear Energy Research, Atomic Energy Council, Executive Yuan, R.O.C., Taoyuan (TW)

(72) Inventors: Yau-Pin Chyou, Taoyuan (TW); Po-Chuang Chen, Taoyuan (TW); Ching-Ying Huang, Taoyuan (TW); Keng-Tung Wu, Taichung (TW); Yu-Jhan Jian, Taoyuan (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 362 days.

(21) Appl. No.: 14/849,695

(22) Filed: Sep. 10, 2015

(65) Prior Publication Data

US 2017/0074507 A1 Mar. 16, 2017

(51) Int. Cl.
*F23C 10/00* (2006.01)

(52) U.S. Cl.
CPC .. *F23C 10/005* (2013.01); *F23C 2900/99008* (2013.01); *Y02E 20/346* (2013.01)

(58) Field of Classification Search
CPC ......... F23C 10/005; F23C 2900/99008; Y02E 20/346
See application file for complete search history.

(56) References Cited

U.S. PATENT DOCUMENTS

| | | | |
|---|---|---|---|
| 7,767,191 B2* | 8/2010 | Thomas | C01B 3/063 423/648.1 |
| 2011/0120560 A1* | 5/2011 | Proll | B01J 8/0055 137/1 |
| 2014/0302444 A1* | 10/2014 | Guillou | F23C 99/00 431/7 |
| 2014/0335461 A1* | 11/2014 | Guillou | F23C 10/005 431/7 |
| 2015/0241056 A1* | 8/2015 | Bollas | F23C 99/006 431/7 |
| 2016/0016137 A1* | 1/2016 | Fan | B01J 8/085 422/142 |
| 2016/0166973 A1* | 6/2016 | Chyou | B01J 8/34 423/220 |
| 2016/0273761 A1* | 9/2016 | Hoteit | F23C 10/01 |

* cited by examiner

*Primary Examiner* — Nathaniel Herzfeld
(74) *Attorney, Agent, or Firm* — Jackson IPG PLLC; Demian K. Jackson

(57) ABSTRACT

A reactor for hydrocarbon fuel is provided. The reactor uses interconnected fluidized beds (IFB) in chemical-looping combustion for multi-stage reduction reactions of an iron-based oxygen carrier, namely hematite ($Fe_2O_3$). Three-phase reduction reactions of $Fe_2O_3$ are accurately and completely controlled. The three-phase reduction reactions are separately processed while oxygen in $Fe_2O_3$ is fully released. Carbon dioxide with high purity is further obtained while hydrogen can be generated as a byproduct under a certain condition. Hence, the present invention has fast throughput, high-efficiency operation and low cost.

4 Claims, 2 Drawing Sheets

HYDROCARBON FUEL REACTOR FOR SEPARATING AND PURIFYING CARBON DIOXIDE

TECHNICAL FIELD OF THE INVENTION

The present invention relates to an apparatus for separating carbon dioxide ($CO_2$); more particularly, relates to using interconnected fluidized beds (IFB) in chemical-looping combustion for processing multiple-stage reduction reactions of an iron-based oxygen carrier, where three-stage reduction reactions of the iron-based oxygen carrier are accurately and completely controlled by separately processing the three-stage reduction reactions; oxygen in the iron-based oxygen carrier can be fully released; high-purity $CO_2$ is obtained with hydrogen generated as a byproduct under a certain condition; and, thus, the present invention has fast throughput, high-efficiency operation and low cost.

DESCRIPTION OF THE RELATED ARTS

Currently, a lot of fossil fuel is used for power generation, which results in high $CO_2$ emission. On the other hand, the development of renewable energy sources is slow; and, thus, fossil fuel is still not replaceable. Carbon capture, storage and use (CCSU) has become an important method to significantly reduce the amount of emitted $CO_2$ for solving the environmental problem of global warming.

According to the fuel thermoelectric conversion modes, the current $CO_2$ capture technologies are mainly divided into three types, including post-combustion capture, pre-combustion capture, oxy-fuel combustion. Therein, the newly-developed chemical-looping combustion is an offbeat oxy-fuel combustion capture. The chemical-looping combustion uses an oxygen carrier as medium to transfer oxygen to fuel reactor in forms of metal oxides, where fuel is burned with oxygen in the metal oxides to obtain high-purity $CO_2$. Thus, the chemical-looping combustion has low exhaustion pollution together with high power-generating efficiency while $CO_2$ is captured. The chemical-looping combustion is world-widely recognized to have a great potential for developing $CO_2$ capture technologies.

At present, some oxygen carriers have gained more attention, which are metal oxides of nickel (Ni), iron (Fe), copper (Cu) and manganese (Mn). Therein, a main iron-based oxygen carrier is hematite ($Fe_2O_3$); and, there are three-stage reduction reactions for $Fe_2O_3$ in the combustion reactors:

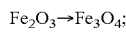

$Fe_2O_3 \rightarrow Fe_3O_4$;

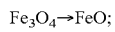

$Fe_3O_4 \rightarrow FeO$;

$FeO \rightarrow Fe$.

The most common chemical-looping reactors include fluidized-bed reactors (FBR) and moving-bed reactors (MBR). Traditional fluidized-bed reactors have bulky beds and can not effectively control the three stages of reducing $Fe_2O_3$ to Fe. As a result, it takes a long time to complete the three-stage reduction reactions. It is nonetheless inefficient. Besides, because oxygen in the metal oxides is not fully released, the final throughput is reduced. Moreover, a newly-developed technology—IFB—is not formally applied in chemical looping. Hence, the prior arts do not fulfill all users' requests on actual use.

SUMMARY OF THE INVENTION

The main purpose of the present invention is to use IFBs in chemical-looping combustion for processing multiple-stage reduction reactions of an iron-based oxygen carrier, where the three-stage reduction reactions of the iron-based oxygen carrier are accurately and completely controlled by separately processing the three-stage reduction reactions; and, oxygen in the iron-based oxygen carrier is fully released.

Another purpose of the present invention is to obtain high-purity $CO_2$ with hydrogen generated as a byproduct under a certain condition, where the present invention has fast throughput, high-efficiency operation and low cost.

To achieve the above purposes, the present invention is a hydrocarbon fuel reactor for separating and purifying $CO_2$, comprising a first reduction reactor, a second reduction reactor, a third reduction reactor and an oxidation reactor, where the first reduction reactor comprises a first lean bed and a first dense bed; the first dense bed has a first orifice at a side at bottom of the first dense bed; the first lean bed has a first weir output at a side on top of the first lean bed; an iron-based oxygen carrier of $Fe_2O_3$ is added in the first lean bed of the first reduction reactor to process a first-stage reduction reaction with a hydrocarbon fuel; in the first-stage reduction reaction, a gas comprising $CO_2$ and steam is generated with $Fe_2O_3$ reduced into magnetite ($Fe_3O_4$); $Fe_3O_4$ is elevated in the first lean bed and passes through the first weir output to enter and sink into the first dense bed; $CO_2$ enters into the first dense bed from a bottom of the first dense bed as a carrying gas to deliver $Fe_3O_4$ to the second lean bed through the first orifice; the second reduction reactor is connected with the first reduction reactor; the second reduction reactor comprises a second lean bed and a second dense bed; the second dense bed has a second orifice at a side at bottom of the second dense bed; the second lean bed has a second weir output at a side on top of the second lean bed; $Fe_3O_4$ enters into the second lean bed from the first orifice to process a second-stage reduction reaction with a hydrocarbon fuel; in the second-stage reduction reaction, a gas comprising $CO_2$ and steam is generated with $Fe_3O_4$ reduced into wüstite (FeO); FeO is elevated in the second lean bed and passes through the second weir output to enter and sink into the second dense bed; $CO_2$ enters into the second dense bed from a bottom of the second dense bed as a carry gas to deliver FeO to the third lean bed through the second orifice; the third reduction reactor is connected with the second reduction reactor; the third reduction reactor comprises a third lean bed and a third dense bed; the third dense bed has a third orifice at a side at bottom of the third dense bed; the third lean bed has a third weir output at a side on top of the third lean bed; FeO enters into the third lean bed from the second orifice to process a third-stage reduction reaction with a hydrocarbon fuel; in the third-stage reduction reaction, a gas comprising $CO_2$ and steam is generated with FeO reduced into iron (Fe); Fe is elevated in the third lean bed and passes through the third weir output to enter and sink into the third dense bed; $CO_2$ enters into the third dense bed from a bottom of the third dense bed as a carry gas to deliver Fe to the oxidation reactor through the third orifice; the oxidation reactor is connected with the first reduction reactor and the third reduction reactor; the oxidation reactor comprises a fourth lean bed and a fourth dense bed; the fourth dense bed has a fourth orifice at a side at bottom to be connected with the first lean bed of the first reduction reactor; the fourth lean bed has a fourth weir output at a side on top of the fourth lean bed; Fe enters into the fourth lean bed from the third orifice to process an oxidation reaction with air; after the oxidation reaction, a gas comprising nitrogen and oxygen is generated with Fe transformed into $Fe_2O_3$; $Fe_2O_3$ is elevated in the fourth lean bed and passes through the fourth weir output to enter and sink into the fourth dense bed; air enters into the fourth dense bed from a bottom of the fourth dense bed as a carry gas to deliver $Fe_2O_3$ through the fourth orifice; and a looping process is formed by delivering $Fe_2O_3$ from the fourth orifice to enter into the first lean bed of the first reduction reactor to be provided as the iron-based oxygen carrier again. Accordingly, a novel hydrocarbon fuel reactor with $CO_2$ separated and purified is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
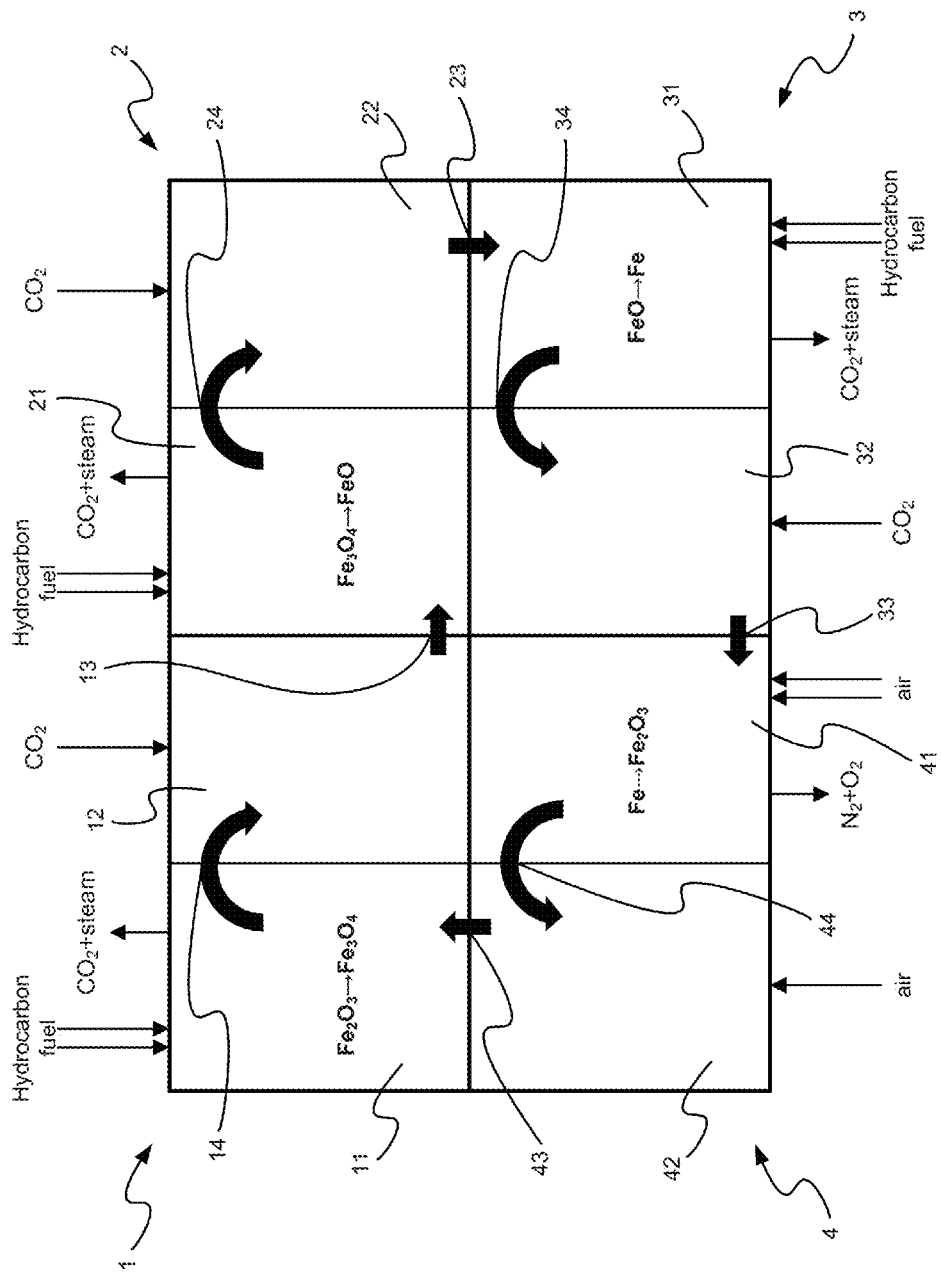
FIG. 1 is the view showing the first state-of-use of the preferred embodiment according to the present invention.
Figure 2:
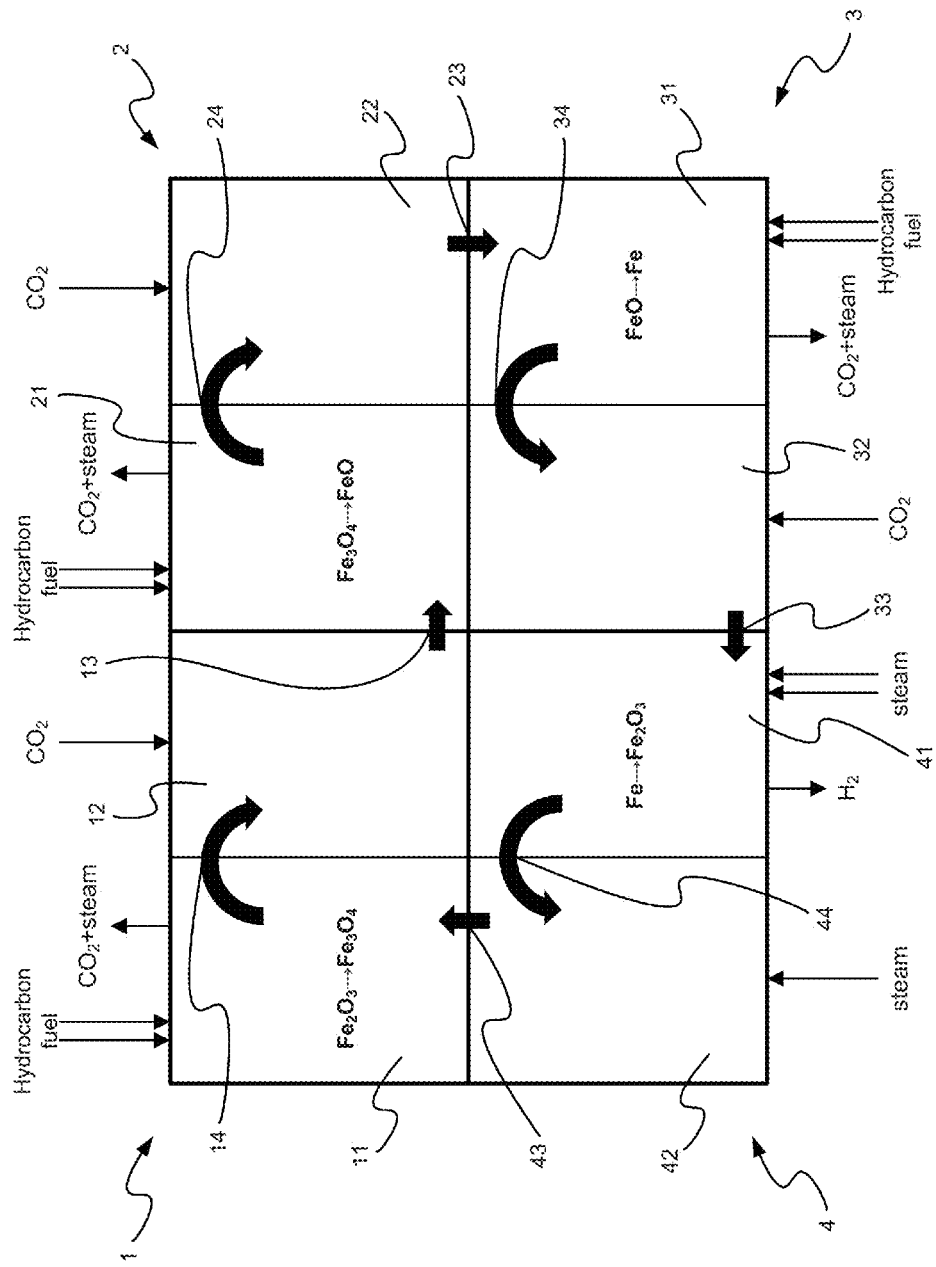
FIG. 2 is the view showing the second state-of-use.

Please refer to FIG. 1 and FIG. 2, which are views showing a first and a second state-of-use of a preferred embodiment according to the present invention. As shown in the figures, the present invention is a hydrocarbon fuel reactor with carbon dioxide ($CO_2$) separated and purified, comprising a first reduction reactor 1, a second reduction reactor 2, a third reduction reactor 3 and an oxidation reactor 4.

The first reduction reactor 1 is communicated with the second reduction reactor 2 and the oxidation reactor 4; and comprises a first lean bed 11 and a first dense bed 12. The first dense bed 12 has a first orifice 13 at a side at bottom, where the first orifice 13 has a diameter of 1.5~6 centimeters (cm) and a height of 4~8 cm. The first lean bed 11 has a first weir output 14 at a side on top.

The second reduction reactor 2 is communicated with the third reduction reactor 3 and the first reduction reactor 1. The second reduction reactor 2 comprises a second lean bed 21 and a second dense bed 22. The second dense bed 22 has a second orifice 23 at a side at bottom, where the second orifice 23 has a diameter of 1.5~6 cm and a height of 4~8 cm. The second lean bed 21 has a second weir output 24 at a side on top.

The third reduction reactor 3 is communicated with the oxidation reactor 4 and the second reduction reactor 2. The third reduction reactor 3 comprises a third lean bed 31 and a third dense bed 32. The third dense bed 32 has a third orifice 33 at a side at bottom, where the third orifice 33 has a diameter of 1.5~6 cm and a height of 4~8 cm. The third lean bed 31 has a third weir output 34 at a side on top.

The oxidation reactor 4 is communicated with the first reduction reactor 1 and the third reduction reactor 3. The oxidation reactor 4 comprises a fourth lean bed 41 and a fourth dense bed 42. The fourth dense bed 42 has a fourth orifice 43 at a side at bottom to be connected with the first lean bed 11 of the first reduction reactor 1, where the fourth orifice 43 has a diameter of 1.5~6 cm and a height of 4~8 cm. The fourth lean bed 41 has a fourth weir output 44 at a side on top.

Thus, a novel hydrocarbon fuel reactor with $CO_2$ separated and purified is obtained.

On using the present invention, fluidized particles of an iron-based oxygen carrier, namely hematite ($Fe_2O_3$), are used. $Fe_2O_3$ is added in the first lean bed 11 of the first reduction reactor 1 to process a first-stage reduction reaction with a hydrocarbon fuel for generating a metal product and a gas with energy exchanged. The energy exchanged would result in heat-absorbing or heat-releasing according to the hydrocarbon fuel used. If a synthetic gas is used as a fuel, heat is released; and, if methane is used, heat is absorbed. On using the synthetic gas as a fuel to release heat, the released heat is used to generate steam required in following processes or to further pushing a steam turbine to drive a power generator for generating electricity. The gas comprising $CO_2$ and steam is generated from the first reduction reactor 1 with $Fe_2O_3$ reduced into the metal product, magnetite ($Fe_3O_4$). The metal product of $Fe_3O_4$ is elevated in the first lean bed 11 and passed through the first weir output 14 to enter into the first dense bed 12 to be sunk. A carrying gas (i.e. $CO_2$) enters into the first dense bed 12 from a bottom of the first dense bed 12 to deliver $Fe_3O_4$ to the second lean bed 21 through the first orifice 13.

A hydrocarbon fuel enters into the second lean bed to process a second-stage reduction reaction with $Fe_3O_4$ for generating a metal product and a gas. The gas comprising $CO_2$ and steam is generated from the second reduction reactor 2. The metal product of FeO obtained from the reduction is elevated in the second lean bed 21 and passed through the second weir output 24 to enter into the second dense bed 22 to be sunk. A carrying gas (i.e. $CO_2$) enters into the second dense bed 22 from a bottom of the second dense bed 22 to deliver FeO to the third lean bed 31 through the second orifice 23.

A hydrocarbon fuel enters into the third lean bed 31 to process a third-stage reduction reaction with FeO for generating a metal product and a gas with energy exchanged. The energy exchanged would result in heat-absorbing or heat-releasing according to the hydrocarbon fuel used. If a synthetic gas is used as a fuel, heat is released; and, if methane is used, heat is absorbed. On using the synthetic gas as a fuel to release heat, the released heat is used to generate steam required in following processes or to further pushing a steam turbine to drive a power generator for generating electricity. The gas comprising $CO_2$ and steam is generated from the third reduction reactor 3. The metal product of Fe obtained from the reduction is elevated in the third lean bed 31 and passed through the third weir output 34 to enter into the third dense bed 32 to be sunk. A carrying gas (i.e. $CO_2$) enters into the third dense bed 32 from a bottom of the third dense bed 32 to deliver Fe to the fourth lean bed 41 through the third orifice 33.

The first-, the second- and the third-stage reduction reactions mentioned above are processed at temperatures of 400~950° C.

Air enters into the fourth lean bed 41 to process an oxidation reaction with Fe for generating a metal product and a gas. The gas comprising nitrogen and oxygen is outputted from the oxidation reactor 4. The metal product of $Fe_2O_3$ obtained from the reduction is elevated in the fourth lean bed 41 and passed through the fourth weir output 44 to enter into the fourth dense bed 42 to be sunk. A carrying gas of air enters from a bottom of the fourth dense bed 42 to deliver $Fe_2O_3$ to the first lean bed 11 through the fourth orifice 43. Thus, a looping process is formed by delivering $Fe_2O_3$ from the fourth dense bed 42 of the oxidation reactor 4 to the first lean bed 11 of the first reduction reactor 1 through the fourth orifice 43 to be provided as the iron-based oxygen carrier added in the first lean bed 11 of the first reduction reactor 1 again.

In another state-of-use, as shown in FIG. 2, Fe is delivered into the fourth lean bed 41 of the oxidation reactor 4 through the third orifice 33 to be processed through an oxidation reaction with a gas providing oxygen atoms (i.e. steam). After the oxidation reaction, a gas of hydrogen ($H_2$) is generated with $Fe_2O_3$ formed. The gas of $H_2$ is outputted from the oxidation reactor 4. $Fe_2O_3$ is elevated in the fourth lean bed 41 and passed through the fourth weir output 44 to enter into the fourth dense bed 42 to be sunk. A carrying gas (i.e. steam) enters into the fourth dense bed 42 from a bottom to deliver $Fe_2O_3$ from the fourth dense bed 42 to the first lean bed 11 through the fourth orifice 43. Thus, a looping process is formed by delivering $Fe_2O_3$ from the fourth dense bed 42 of the oxidation reactor 4 to the first lean bed 11 of the first reduction reactor 1 through the fourth orifice 43 to be provided as the iron-based oxygen carrier added in the first lean bed 11 of the first reduction reactor 1 again.

To sum up, the present invention is a hydrocarbon fuel reactor with $CO_2$ separated and purified, where interconnected fluidized beds (IFB) are used in chemical-looping combustion for processing multiple-stage reduction reactions of an iron-based oxygen carrier, namely $Fe_2O_3$; three-stage reduction reactions of $Fe_2O_3$ are accurately and completely controlled by separately processing the three-stage reduction reactions; oxygen in the iron-based oxygen carrier is fully released and high-purity $CO_2$ is obtained with hydrogen generated as a byproduct under a certain condition; and, thus, the present invention has fast throughput, high-efficiency operation and low cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A hydrocarbon fuel reactor for separating and purifying carbon dioxide ($CO_2$), comprising:
    a first reduction reactor,
        wherein said first reduction reactor comprises a first lean bed and a first dense bed; said first dense bed has a first orifice at a side of a lowest position of said first dense bed; and said first lean bed has a first weir output at a side of a highest position of said first lean bed; and
        wherein an iron-based oxygen carrier of hematite ($Fe_2O_3$) is added in said first lean bed of said first reduction reactor to process a first-stage reduction reaction with a hydrocarbon fuel; after said first-stage reduction reaction, a gas comprising $CO_2$ and steam is generated with $Fe_2O_3$ reduced into magnetite ($Fe_3O_4$); $Fe_3O_4$ is elevated in said first lean bed and passes through said first weir output to enter and sink into said first dense bed; a carrying gas of $CO_2$ enters into said first dense bed from a bottom of said first dense bed to pass $Fe_3O_4$ through said first orifice;
    a second reduction reactor,
        wherein said second reduction reactor is connected with said first reduction reactor; said second reduction reactor comprises a second lean bed and a second dense bed; said second dense bed has a second orifice at a side of a lowest position of said second dense bed; and said second lean bed has a second weir output at a side of a highest position of said second lean bed; and
        wherein $Fe_3O_4$ enters into said second lean bed from said first orifice to process a second-stage reduction reaction with a hydrocarbon fuel; after said second-stage reduction reaction, a gas comprising $CO_2$ and steam is generated with $Fe_3O_4$ reduced into wüstite (FeO); FeO is elevated in said second lean bed and passes through said second weir output to enter and sink into said second dense bed; a carrying gas of $CO_2$ enters into said second dense bed from a bottom of said second dense bed to pass FeO through said second orifice;
    a third reduction reactor,
        wherein said third reduction reactor is connected with said second reduction reactor; said third reduction reactor comprises a third lean bed and a third dense bed; said third dense bed has a third orifice at a side of a lowest position of said third dense bed; and said third lean bed has a third weir output at a side of a highest position of said third lean bed; and
        wherein FeO enters into said third lean bed from said second orifice to process a third-stage reduction reaction with a hydrocarbon fuel; after said third-stage reduction reaction, a gas comprising $CO_2$ and steam is generated with FeO reduced into iron (Fe); Fe is elevated in said third lean bed and passes through said third weir output to enter and sink into said third dense bed; a carrying gas of $CO_2$ enters into said third dense bed from a bottom of said third dense bed to pass Fe through said third orifice; and
    an oxidation reactor,
        wherein said oxidation reactor is connected with said third reduction reactor and said first reduction reactor; said oxidation reactor comprises a fourth lean bed and a fourth dense bed; said fourth dense bed has a fourth orifice at a side of a lowest position of said fourth dense bed to be connected with said first lean bed of said first reduction reactor; and said fourth lean bed has a fourth weir output at a side of a highest position of said fourth lean bed; and
        wherein Fe enters into said fourth lean bed from said third orifice to process an oxidation reaction with air; after said oxidation reaction, a gas comprising nitrogen and oxygen is outputted with Fe transformed into $Fe_2O_3$; $Fe_2O_3$ is elevated in said fourth lean bed and passes through said fourth weir output to enter and sink into said fourth dense; a carrying gas of air enters into said fourth dense bed from a bottom of said fourth dense bed to pass $Fe_2O_3$ through said fourth orifice,
        wherein a looping process is formed by delivering $Fe_2O_3$ from said fourth dense bed of said oxidation reactor to said first lean bed of said first reduction reactor through said fourth orifice to be provided as said iron-based oxygen carrier added in said first lean bed of said first reduction reactor again.

2. The hydrocarbon fuel reactor according to claim 1, wherein said first-, said second- and said third-stage reduction reactions are processed at temperatures of 400~950 Celsius degrees (° C.).

3. A hydrocarbon fuel reactor for separating and purifying $CO_2$, comprising:
    a first reduction reactor,
        wherein said first reduction reactor comprises a first lean bed and a first dense bed; said first dense bed has a first orifice at a side of a lowest position of said first dense bed; and said first lean bed has a first weir output at a side of a highest position of said first lean bed; and wherein $Fe_2O_3$ is added in said first lean bed as an iron-based oxygen carrier in said first reduction reactor to process a first-stage reduction reaction with a hydrocarbon fuel; after said first-stage reduction reaction, a gas comprising $CO_2$ and steam is generated with $Fe_2O_3$ reduced into $Fe_3O_4$; $Fe_3O_4$ is elevated in said first lean bed and passes through said first weir output to enter and sink into said first dense bed; a carrying gas of $CO_2$ enters into said first dense bed from a bottom of said first dense bed to pass $Fe_3O_4$ through said first orifice;

a second reduction reactor, wherein said second reduction reactor is connected with said first reduction reactor; said second reduction reactor comprises a second lean bed and a second dense bed; said second dense bed has a second orifice at a side of a lowest position of said second dense bed; and said second lean bed has a second weir output at a side of a highest position of said second lean bed; and wherein $Fe_3O_4$ enters into said second lean bed from said first orifice to process a second-stage reduction reaction with a hydrocarbon fuel; after said second-stage reduction reaction, a gas comprising $CO_2$ and steam is generated with $Fe_3O_4$ reduced into FeO; FeO is elevated in said second lean bed and passes through said second weir output to enter and sink into said second dense bed; a carrying gas of $CO_2$ enters into said second dense bed from a bottom of said second dense bed to pass FeO through said second orifice;

a third reduction reactor, wherein said third reduction reactor is connected with said second reduction reactor; said third reduction reactor comprises a third lean bed and a third dense bed; said third dense bed has a third orifice at a side of a lowest position of said third dense bed; and said third lean bed has a third weir output at a side of a highest position of said third lean bed; and wherein FeO enters into said third lean bed from said second orifice to process a third-stage reduction reaction with a hydrocarbon fuel; after said third-stage reduction reaction, a gas comprising $CO_2$ and steam is generated with FeO reduced into iron (Fe); Fe is elevated in said third lean bed and passes through said third weir output to enter and sink into said third dense bed; a carrying gas of $CO_2$ enters into said third dense bed from a bottom of said third dense bed to pass Fe through said third orifice; and an oxidation reactor, wherein said oxidation reactor is connected with said third reduction reactor and said first reduction reactor; said oxidation reactor comprises a fourth lean bed and a fourth dense bed; said fourth dense bed has a fourth orifice at a side of a lowest position of said fourth dense bed to be connected with said first lean bed of said first reduction reactor; and said fourth lean bed has a fourth weir output at a side of a highest position of said fourth lean bed; and wherein Fe enters into said fourth lean bed from said third orifice to process an oxidation reaction with steam; after said oxidation reaction, a gas comprising hydrogen is generated with Fe transformed into $Fe_2O_3$; $Fe_2O_3$ is elevated in said fourth lean bed and passes through said fourth weir output to enter and sink into said fourth dense bed; a carrying gas of steam enters into said fourth dense bed to pass $Fe_2O_3$ to said fourth orifice from said fourth dense bed, wherein a looping process is formed by delivering $Fe_2O_3$ from said fourth dense bed of said oxidation reactor to said first lean bed of said first reduction reactor through said fourth orifice to be provided as said iron-based oxygen carrier added in said first lean bed of said first reduction reactor again.

4. The hydrocarbon fuel reactor according to claim 3, wherein said first-, said second- and said third-stage reduction reactions are processed at temperatures of 400~950° C.

* * * * *